United States Patent [19]

Ramcke

[11] Patent Number: 4,743,319

[45] Date of Patent: May 10, 1988

[54] METHOD OF AND APPARATUS FOR MAKING SELF STICKING NOTE PADS

[75] Inventor: Bernd Ramcke, Hamburg, Fed. Rep. of Germany

[73] Assignee: E.C.H. Will (GmbH & Co.), Hamburg, Fed. Rep. of Germany

[21] Appl. No.: 942,194

[22] Filed: Dec. 16, 1986

[30] Foreign Application Priority Data

Dec. 17, 1985 [DE] Fed. Rep. of Germany ....... 3544507

[51] Int. Cl.[4] .............................................. B32B 31/18

[52] U.S. Cl. ...................................... 156/64; 156/264; 156/267; 156/277; 156/378; 156/512; 156/517; 156/558; 271/225; 271/258; 271/303; 412/14; 412/37

[58] Field of Search ................. 156/64, 264, 267, 271, 156/259, 378, 512, 516, 517, 547, 548, 558, 566, 277; 414/43, 28, 29; 271/199, 218, 225, 258, 303; 270/58; 493/331, 332, 334, 343; 412/6, 16, 37, 14

[56] References Cited

U.S. PATENT DOCUMENTS

| | | | |
|---|---|---|---|
| 4,201,102 | 5/1980 | Rudszinat | 83/298 |
| 4,255,998 | 3/1981 | Rudszinat | 83/298 |
| 4,257,298 | 3/1981 | Aykut | 83/482 |
| 4,257,299 | 3/1981 | Aykut | 83/482 |
| 4,297,066 | 10/1981 | Ramcke et al. | 414/43 |
| 4,354,890 | 10/1982 | Maffey | 156/264 |
| 4,385,537 | 5/1983 | Wolf | 83/100 |
| 4,387,890 | 6/1983 | Lampe | 271/225 |
| 4,440,051 | 4/1984 | Aykut | 83/72 |
| 4,500,241 | 2/1985 | Peters et al. | 412/37 |
| 4,508,210 | 4/1985 | Ramcke et al. | 198/627 |
| 4,523,502 | 6/1985 | Besemann | 83/71 |
| 4,548,404 | 10/1985 | Brandt et al. | 271/303 |
| 4,572,350 | 2/1986 | Besemann | 198/372 |
| 4,599,039 | 7/1986 | Neubuser et al. | 414/786 |
| 4,662,970 | 5/1987 | Bancroft | 156/264 |

*Primary Examiner*—Caleb Weston

*Attorney, Agent, or Firm*—Peter K. Kontler

[57] ABSTRACT

Self-sticking note pads are mass-produced in a continuous operation starting with a running web of paper which is drawn from a roll and one side of which is coated with longitudinally or transversely extending stripes of adhesive before the web is subdivided into a series of large panels which are gathered into stacks and overlapped by bottom covers prior to subdivision into pads of desired size. The stacks are preferably inverted prior to subdivision into pads so that the bottom covers are disposed below the lowermost panels of the corresponding stacks, and the subdivision of successive stacks into pads takes place in two immediately following stages. The pads are transported to a packing machine.

15 Claims, 4 Drawing Sheets

METHOD OF AND APPARATUS FOR MAKING SELF STICKING NOTE PADS

BACKGROUND OF THE INVENTION

The invention relates to a method of and to an apparatus for making pads of coherent sheets, and more particularly to improvements in a method of and an apparatus for making so-called post-it (trademark) self-sticking note pads wherein a portion of each next-following sheet in a stack of sheets adheres to a layer of adhesive at the rear side of the preceding sheet.

Sheets which are detached from self-sticking note pads can be used for attachment to other sheets, to metallic surfaces or to any other smooth surfaces and can be detached and reattached a number of times. The adhesive reduces the likelihood of unintentional detachment and/or unintentional shifting of the sheets. Moreover, there is no need to maintain a supply of paper clips, and a sheet can be detached without leaving any traces on the surface from which it was removed.

In accordance with heretofore known proposals to make self-sticking note pads, a paper web is drawn from a large roll and one of its sides is coated with adhesive in a suitable applicator, for example, an applicator which is a modified screen printing machine. The thus coated web is again convoluted to form a roll and the roll is transferred to a severing station where the web is withdrawn and is subdivided into a series of sections which are accumulated to form stacks or reams. This often creates serious problems because one side of each section carries a coating of adhesive so that the sections cannot be readily shifted or shuffled into stacks. The situation is aggravated due to the fact that, as a rule, the sections which leave the severing station form a so-called scalloped stream of partially overlapping sheets.

Layers of large-size sections are delivered to a further station where several cutting machines with integrated cutting sequences operate to subdivide the layers into pads of desired size. The pads are transported to a discrete packing station to be draped into cellophane or foil, either individually or in groups of two or more.

The just discussed discontinuous operation involves a number of splintered discrete operations which contributes significantly to the cost of the products, especially because the operation must be monitored and regulated by a relatively large number of workers. Moreover, the space requirements of the plant are substantial and the initial as well as maintenance cost for the production line is very high.

OBJECTS AND SUMMARY OF THE INVENTION

An object of the invention is to provide a simple and economical method of making self-sticking note pads in a small area and in large quantities per unit of time.

Another object of the invention is to provide a method which can be automated to any desired degree and which can be carried out with a minimum of supervision or regulation by attendants.

A further object of the invention is to provide a novel and improved apparatus for the practice of the above outlined method.

Still another object of the invention is to provide an apparatus whose space requirements are a fraction of the space requirements of conventional apparatus and which is constructed and assembled in such a way that large panels or sections of an adhesive-coated web stock can be readily stacked in a small area and at a high speed.

An additional object of the invention is to provide the apparatus with novel and improved web advancing, coating, severing, stacking, trimming, packing and other units.

A further object of the invention is to provide an apparatus whose output is higher than that of conventional apparatus and which can be rapidly and reliably converted for the making of larger or smaller self-sticking note pads.

Another object of the invention is to provide the apparatus with novel and improved means for treating a continuous web of paper preparatory to conversion of the web into a number of self-sticking note pads.

A further object of the invention is to provide novel and improved means for manipulating self-sticking note pads.

An additional object of the invention is to provide an apparatus which can be automated to any desired degree.

One feature of the invention resides in the provision of a method of making self-sticking note pads with overlapping partially coherent sheets of a first size. The method comprises the steps of establishing and maintaining a source of a paper web and advancing the web from the source longitudinally along a predetermined path, applying adhesive to one side of the web in a first portion of the path, subdividing the adhesive-coated web into panels having a second size which is a multiple of the first size including cutting across the leader of the running web in a second portion of the path, gathering the panels into stacks immediately following the subdividing step, applying a cover to one side of each stack, trimming one or more edges of each stack, subdividing each stack into a plurality of pads, and packing the pads, either individually or in sets of two or more.

The adhesive applying step can include providing the one side of the web with a plurality of longitudinally extending stripes of adhesive or providing the one side of the web with a plurality of transversely extending stripes of adhesive, depending on the selected mode of subdividing the stacks into pads of desired (first) size. The adhesive applying step can include coating the web with adhesive in accordance with a flexographic technique. For example, the one side of the web can be coated with a low-viscosity disperse adhesive which is repeatedly activatable, particularly in response to the application of pressure.

The web can be provided with an antiadhesive coating such as a silicone-containing lacquer. Moreover, a bonding primer can be applied to the one side of the web prior to the adhesive applying step. The bonding primer can be applied to those portions of the one side of the web which are to be coated with adhesive.

Another feature of the invention resides in the provision of an apparatus for making self-sticking note pads with overlapping partially coherent sheets having a first size. The apparatus comprises a source of supply of a paper web (e.g., a large reel or bobbin which is mounted on a spindle), means (e.g., at least one pair of rollers at least one roller of which is driven) for advancing the web from the source along a predetermined path, means (e.g., a suitable paster) for applying adhesive to selected portions of one side of the web in a first portion of the path, a cross cutter adjacent a second portion of the path and having means for subdividing the adhesive-coated web into a succession of panels each having a second size which is a multiple of the first size, means for gathering the panels into a series of stacks, means for applying bottom covers to the stacks, means for trimming the stacks, means for subdividing each trimmed stack into a plurality of pads, and means for transporting the pads to a further processing station (particularly to a packing station).

The adhesive applying means can comprise a flexographic printer, and the apparatus can further comprise means for applying to the one side of the web a bonding primer intermediate the source and the adhesive applying means. The apparatus can further comprise an imprinting mechanism which is adjacent a third portion of the path and has means for applying printed matter to selected portions of the web so that the printed matter will appear on one, more or all sheets of a finished pad.

The apparatus can also comprise means for monitoring the condition of panels and means for segregating defective panels from satisfactory panels ahead of the subdividing means for the stacks.

Means can be provided to change the orientation of stacks (preferably for turning the stacks upside down) and of the respective bottom covers ahead of the subdividing means for the stacks. The apparatus preferably also comprises means for conveying the stacks and the bottom covers from the trimming means toward the processing station, and such conveying means preferably includes means for changing the direction of travel of stacks ahead of the subidiving means for the stacks. The subdividing means for the stacks can comprise a knife carrier which is provided with a set of fixedly mounted knives and is removably mounted on a support so that it can be readily replaced by a carrier for a differently distributed set of knives.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
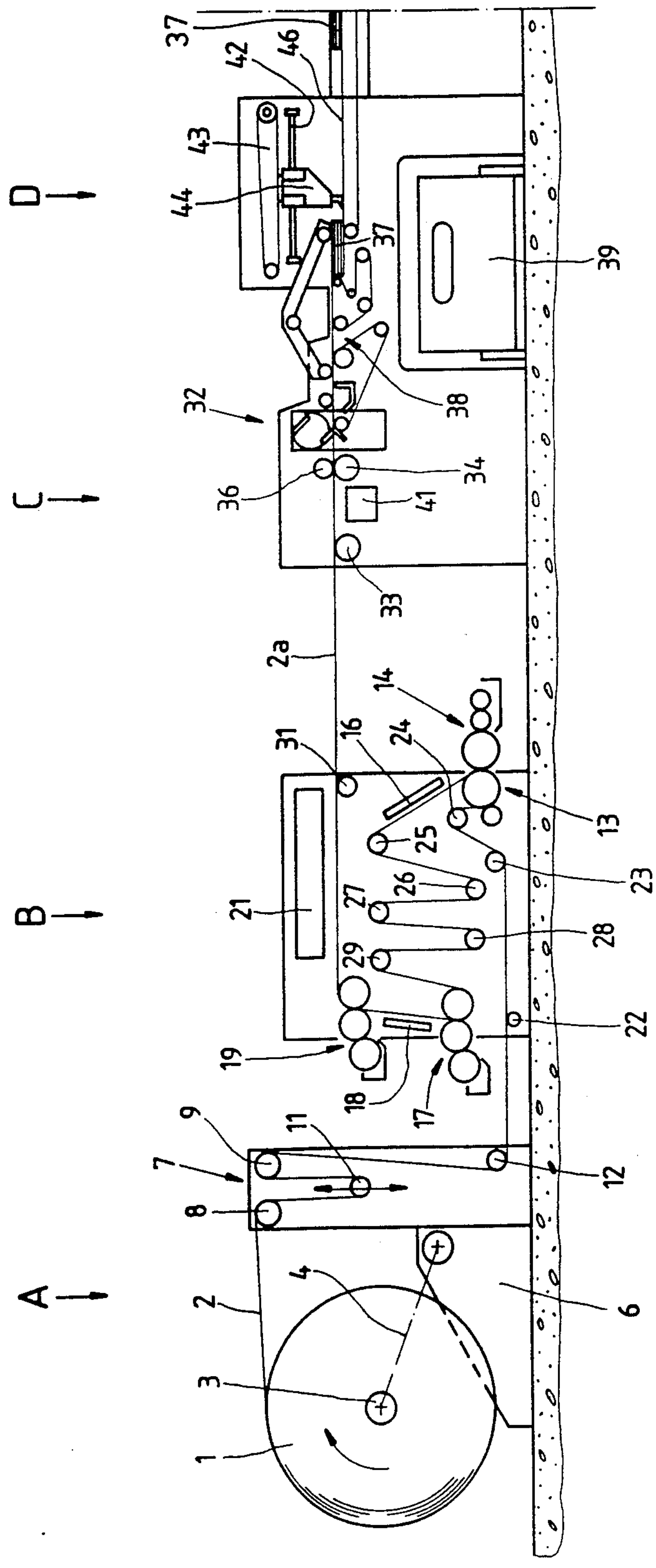
FIG. 1 is a schematic elevational view of a portion of the improved apparatus.
Figure 2:
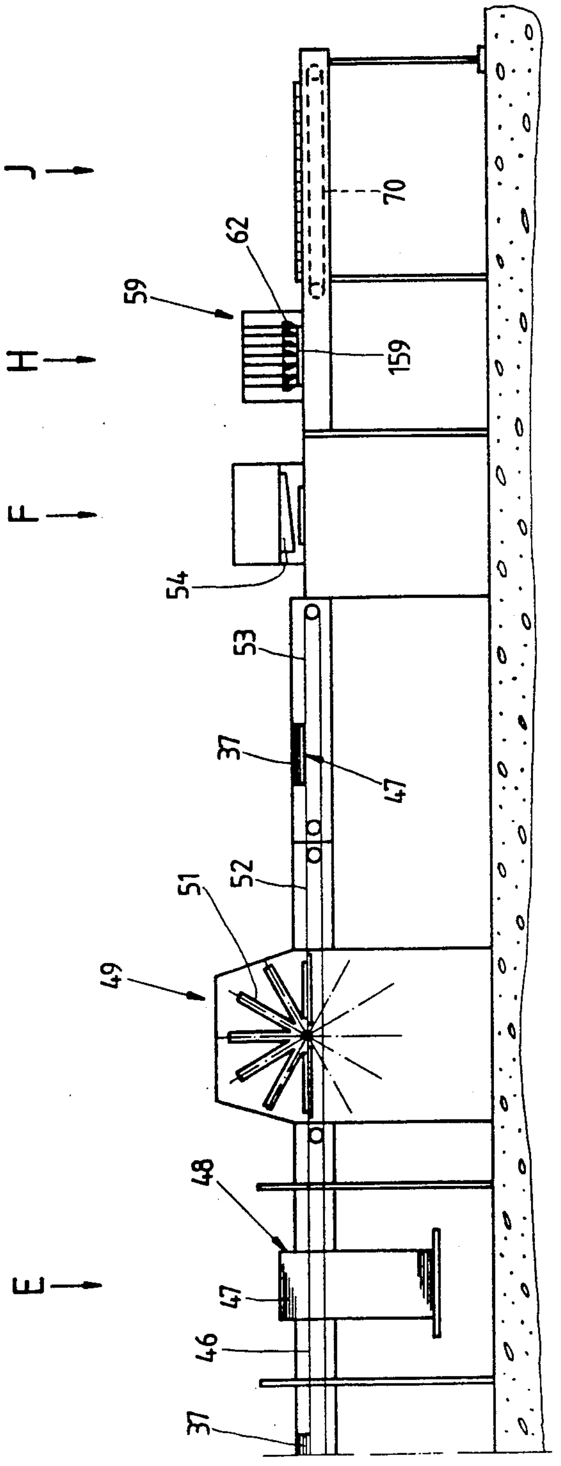
FIG. 2 is a schematic elevational view of the remaining portion of the apparatus.

Referring first to FIGS. 1 and 2, there is shown an apparatus which serves to make self-sticking note pads 61. The apparatus comprises a spindle 3 for a roll 1 which constitutes a source of supply of a continuous web 2. The roll 1 is located at an unwinding station A and the supply of web 2 thereon is coated with an anti-adhesive material of a type well known from the art of making self-sticking note pads. The spindle 3 is mounted in a frame 6 and is carried by a system of pivotable levers 4 (indicated by a phantom line). The means for advancing the web 2 longitudinally along a predetermined path comprises a first pair of advancing rolls 13 at an adhesive applying station B and a second pair of advancing rolls 34, 36 at a cutting station C. At least one of the rolls 34, 36 is driven and these rolls are biased toward each other to define a nip for successive increments of the running adhesive-coated web 2*a*.

The roll 1 is followed by a magazine 7 wherein the web 2 is looped between a pair of stationary idler rolls 8, 9 and a dancer roll 11 so as to equalize internal stresses in the web 2 which thereupon advances over a guide roll 12 at the discharge end of the unwinding station A to enter the adhesive applying station B by travelling over additional guide rolls 22, 23 and 24 toward and into the nip of the advancing rolls 13. Selected portions of one side of the running web 2 are coated with a well known bonding primer during travel past a primer applicator 14 which precedes a heating device 16 serving to ensure rapid drying of the primer before the respective increments of the web 2 enter an adhesive applicator 17 after having advanced through a meandering portion of the path defined by a set of rolls 25, 26, 27, 28 and 29. The applicator 17 applies adhesive to selected portions of the one side of the web 2 and is followed by a heating device 18 which ensures rapid drying of the applied adhesive stripes before the respective increments of the adhesive-coated web 2*a* advance through an imprinting mechanism 19 of conventional design. The mechanism 19 can apply printed matter to the adhesive-carrying and/or other side of the web 2*a* and the web 2*a* thereupon advances along guide rolls 31, 33 and through the nip of the advancing rolls 34, 36 to enter the cutting station C. A further heating device 21 can be provided downstream of the imprinting mechanism 19 to ensure rapid drying of the printed matter prior to subdivision of the web 2*a* into a series of discrete panels 63 (FIG. 4) each having a size several times that of a sheet in a pad 61. The imprinting mechanism 19 and the heating device 21 are optional. The adhesive applicator 17 can resemble or constitute a conventional flexographic printer; such adhesive applicators are preferred if the adhesive to be applied is a low-viscosity disperse adhesive which is capable of repeated activation, particularly in response to the application of pressure.

The bonding primer which is applied at 14 ensures that the adhesive which is applied at 17 properly adheres to the respective portions of the one side of the web 2. The applicator 17 can apply longitudinally extending stripes 55 (FIG. 3) of adhesive, and the number of stripes 55 will depend on the width of the web 2, i.e., on the number of times the width of the web exceeds the width of the sheet in a pad 61. If the adhesive is to separably bond transversely extending portions of the sheets in a pad 61, the applicator 17 is designed to apply to the web 2 a succession of transversely extending stripes of adhesive, and the number of stripes per panel 63 equals the number of times the length of a panel exceeds the length of the sheet in a pad 61.

The station C accommodates a cross cutter 32 which is disposed downstream of the advancing rolls 34, 36 and subdivides the leader of the running (adhesive-coated) web 2*a* into a series of relatively large panels 63 each of which can be subdivided into a substantial number of sheets. The cross cutter 32 may be of the type disclosed, for example, in U.S. Pat. Nos. 4,201,102, 4,255,998, 4,257,298, 4,257,299 and 4,440,051.

The freshly severed panels 63 are advanced into a gathering station D where they are accumulated into a succession of stacks 37. The mechanism for accumulating panels 63 into stacks 37 can be similar to those disclosed in U.S. Pat. Nos. 4,385,537, 4,297,066 and 4,440,051. The quality of successive panels 63 is monitored by a device which controls a segregating device 38 serving to direct defective panels 63 into a collecting receptacle 39. Reference may be had to U.S. Pat. No. 4,548,404 which discloses a monitoring device (41) and the manner in which the monitoring device controls the segregating means for defective panels or sheets.

If the improved apparatus comprises an imprinting mechanism (19) and the imprinting mechanism is in use, and/or if the adhesive applicator 17 is designed to provide the web 2 with transversely extending stripes of adhesive, the operation of the cross cutter 32 must be synchronized with the operation of the imprinting mechanism 19 and adhesive applicator 17. The synchronizing means 41 (shown schematically in FIG. 1) is or can be of conventional design and its purpose is to ensure that printed matter will appear on a predetermined portion of each sheet or of each selected sheet in a pad 61 as well as that the adhesive will coat a predetermined portion of each sheet in each pad 61. One mode of synchronizing the operation of several units which act upon a running web of paper or the like and upon successive sheets or panels which are obtained by subdividing the web is disclosed in U.S. Pat. No. 4,523,502. The mode of gathering sheets 63 into stacks 37 at the gathering station D which follows the cutting station C is or can be the same as disclosed in U.S. Pat. No. 4,599,039. The gathering or stacking unit comprises tongs 44 movable back and forth along horizontal guide rails 42 by a suitable drive 43 to transfer successive stacks 37 onto a conveyor 46 which advances the stacks toward a cover applying station E wherein each stack 37 is overlapped by a bottom cover 47 which is transferred from a pile 48 of superimposed covers. The manner in which the conveyor 46 cooperates with additional conveyor means to advance stacks 37 at a predetermined mutual spacing past the station E is or can be the same as disclosed in U.S. Pat. No. 4,508,210. The pile 48 at the station E constitutes but one form of a supply of bottom covers 47 which are to be applied to successive stacks 37.

The pile 48 is or can be followed by a turn-around device 49 which inverts each stack 37 and the respective bottom cover 47 so that each bottom cover is located below the lowermost panel 63 of the corresponding stack The turn-around device 49 comprises a turret 51 which rotates about a horizontal axis and is or can be constructed and operated in a manner as disclosed in U.S. Pat. No. 4,500,241.

Figure 3:
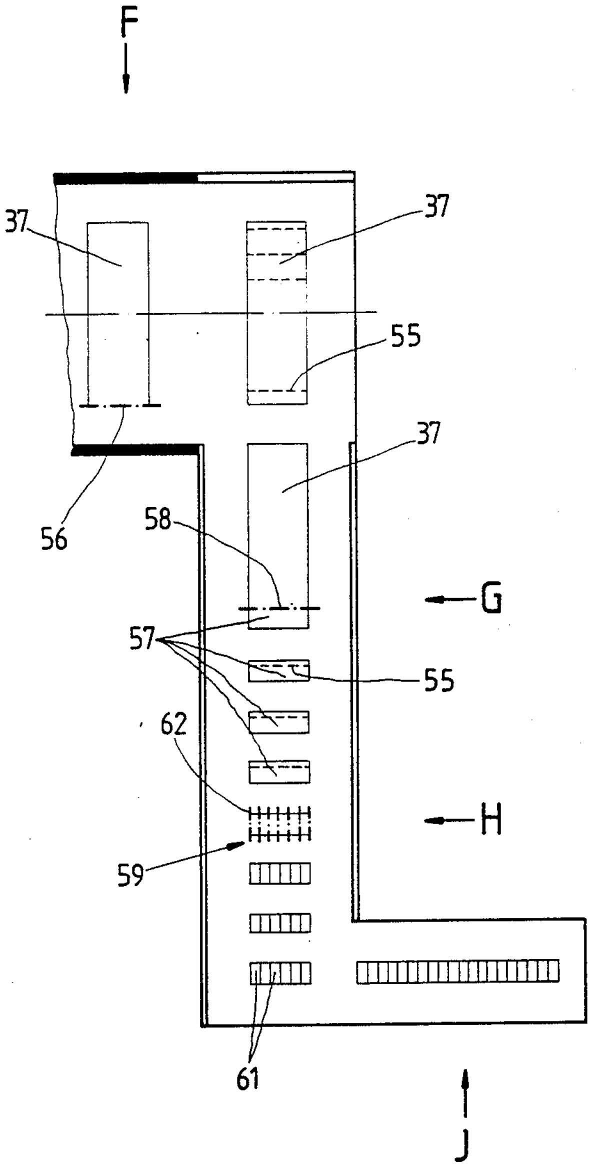
FIG. 3 is an enlarged plan view of a part of that portion of the apparatus which is shown in FIG. 2.

Inverted stacks 37 which are discharged by the turret 51 are deposited on a system of conveyors 52, 53 which advance the stacks 37 (each resting on a bottom cover 47) to a first subdividing station G by way of the trimming station F where one or more marginal portions of the stacks 37 and bottom covers 47 are trimmed by a trimming device 54. A freshly trimmed marginal portion of a stack 37 which has advanced beyond the trimming station F is indicated in FIG. 3 by a phantom line 56. As shown in FIG. 3, the conveyor system between the stations F and G is designed to change the direction of travel of successive trimmed stacks 37 and of the corresponding bottom covers 47 through an angle of 90 degrees. Reference may be had to U.S. Pat. Nos. 4,387,890 and 4,572,350. The width of each stack 37 which arrives at the station F exceeds the length of the stack (as considered in the direction of travel of the conveyors 52 and 53). Thus, when the direction of travel of trimmed stacks 37 is changed, the thus reoriented stacks advance longitudinally, i.e., in a direction parallel to their maximum dimensions. The station G comprises means for subdividing each stack 37 into a series of narrower strips 57 each of which can be subdivided into a single file of pads 61. Each strip 57 is composed of elongated superimposed narrow sheets having longitudinally extending stripes 55 of adhesive. The knife by which a stack 37 which advances through the subdividing station G is repeatedly cut to yield a succession of strips 57 is indicated by a phantom line 58. The subdividing station G constitutes one-half of a composite subdividing station which further includes a second subdividing station H with a carrier 59 having a set of fixedly mounted knives 62 which subdivide successive strips 57 into rows of pads 61. The carrier 59 is detachably mounted on a support 159 and is separable therefrom, together with the set of knives 62, to be replaced with a different carrier if the format of the pads 61 is to be changed or if the carrier 59 and/or its knives 62 require inspection, replacement or repair.

The pads 61 are advanced by transporting means 70 to a packing station J or to a magazine which precedes the packing station. The means for grouping the pads 61 on their way toward and/or into the packing station J so that the pads 61 can be packed (e.g., in wrappers of a transparent plastic material) either individually or in groups of two or more is not specifically shown in the drawing. The transporting means 70 can advance rows of pads 61 longitudinally or sideways, depending on the desired grouping of pads and on the design of the packing machine.

Figure 4:
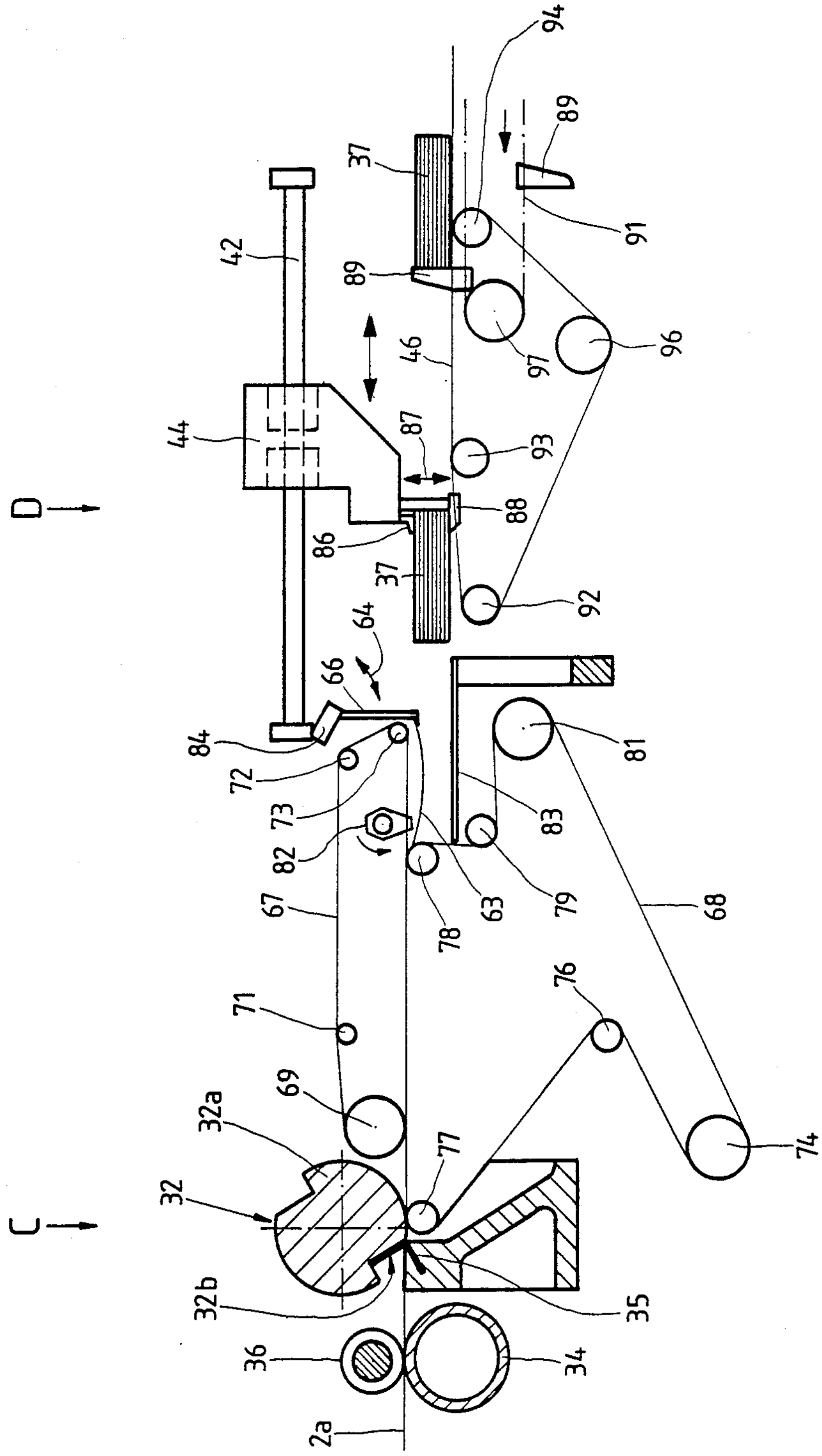
FIG. 4 is an enlarged partly elevational and partly vertical sectional view of the cross cutter and of the stacking device.

Certain details of the units at the cutting station C and at the immediately following gathering station D are shown in FIG. 4. The cross cutter 32 comprises a rotary drum-shaped holder **32*a* for an orbiting knife 32*b* which cooperates with a stationary counterknife 35. The panels 63 which are severed from the leader of the adhesive-coated web 2*a* are advanced toward a wall 66 which is pivotable in directions indicated by a double-headed arrow 64. Successive panels 63 are transported between the upper reach of a lower endless belt conveyor 68 and the lower reach of an upper endless belt conveyor 67. The conveyor 67 is trained over pulleys 69, 71, 72 and 73, and the conveyor 68 is trained over pulleys 74, 76, 77, 78, 79 and 81. Each of the conveyors 67, 68 can consist of a set of two or more narrower belts which are disposed in parallel vertical planes. The narrower belts of the upper conveyor 67 are preferably adjustable transversely of the path of movement of panels 63 so that they engage successive panels 63 at locations which are not coated with adhesive. A panel 63 which approaches the wall 66 is engaged by the lobe of a driven rotary cam 82 which directs the panel downwardly onto a platform 83. The wall 66 is pivoted out of the way as soon as it has arrested the last panel 63 of a stack 37 in an optimum position for descent onto the platform 83. The number of panels 63 in a stack 37 which is being gathered on the platform 83 is counted by an electronic counter 84 which transmits signals to the drive 43 for the tongs 44 so as to ensure that each fully grown stack 37 will contain a predetermined number of panels 63. This is of importance for proper operation of the next-following units of the improved apparatus and for the making of pads 61** each of which contains a predetermined number of partially coherent sheets.

It will be noted that the conversion of a continuous stream of discrete non-overlapping panels 63 into a succession of stacks 37 takes place without the need for any shifting of partially overlapping panels relative to each other as is required in conventional apparatus. Shifting of partially overlapping panels which are coated with adhesive invariably presents problems and is likely to cause frequent interruptions of operation or the accumulation of unsatisfactory stacks.

The tongs 44 pull successive fully grown stacks 37 off the platform 83 and deposit them on the conveyor 46 which advances the stacks toward and onto a further conveyor 91. The tongs 44 have a fixedly mounted upper jaw 86 and a lower jaw 88 which is movable up and down in directions indicated by a double-headed arrow 87. The conveyor 91 is or can constitute a chain which is trained over sprocket wheels 97 (only one shown) and carries pivotable pushers 89. The conveyor 46 is trained over pulleys 92, 93, 94 and 96.

The segregating device 38 has been omitted in FIG. 4 for the sake of clarity.

The subdivision of the web **2*a* into panels 63 preferably takes place immediately following the application of adhesive at 17, and the gathering of panels 63 into stacks 37 immediately follows subdivision of the web 2*a* at the station C. The subdivision of stacks 37 into pads 61 immediately follows the placing of bottom covers 47 onto successive stacks. As used herein, the term "immediately" is intended to denote that the various operations take place one after the other but without excluding the possibility of using intermediate steps, such as imprinting at 19 between the adhesive applying step (at 17) and the cutting step at C. The same holds true for the inverting step in the turn-around device 49. The application of a bonding primer at 14 also constitutes an optional feature of the invention. Such primer is applied for the purpose of ensuring the application of adhesive to predetermined portions (stripes) of one side of the running web 2**.

The provision of the turn-around device 49 is desirable and advantageous because inversion of stacks 37 between the stations E and F renders it possible to advance the panels 63 and the stacks 37 in a simpler and more predictable manner since the adhesive-carrying sides of the panels 63 face upwardly. The adhesive-coated portions at the underside of each upper panel properly adhere to the uncoated upper sides of the panels therebelow not later than during travel through the second subdividing station H. The sheets of each pad 61 also adhere to each other since a portion of the underside of each upper sheet is coated with adhesive and sticks to the adjacent sheet. The same holds true for the lowermost sheets of the pads 61, i.e., such sheets adhere to the upper sides of the respective bottom covers (portions of covers 47). The utilization of the turn-around device 49 brings about the additional advantage of reducing the likelihood of damage to and/or defacing of the exposed panel 63 of each stack 37 and the exposed sheet of each pad 61. This will be readily appreciated since the conveyor 52 and each following conveyor comes in contact with the bottom covers but not with the panels or portions of panels.

The provision of two or more carriers 59 for use at the second subdividing station H also constitutes an optional but desirable and advantageous feature of the improved apparatus. It has been found that the provision of two or more carriers 59 with sets of fixedly mounted knives 62 thereon simplifies conversion of the apparatus for the making of differently dimensioned pads.

The various units of the apparatus together form a continuous production line which contributes to higher output of the apparatus and to the making of high-quality self-sticking note pads. The means for changing the direction of travel of panels 63 and stripes 57 between the stations F and G renders it possible to reduce the overall length of the production line.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of making self-sticking note pads with overlaping partially coherent sheets having a first size, comprising the steps of establishing and maintaining a source of a paper web and advancing the web from the source along a predetermined path; applying adhesive to one side of the web in a first portion of the path; subdividing the web into panels having a second size which is a multiple of said first size, including cutting across a leader of the web in a second portion of the path; gathering the panels into stacks immediately following said subdividing step; applying a cover to one side of each stack; trimming at least one edge of each stack; subdividing each stack into a plurality of pads; and packing the pads.

2. The method of claim 1, wherein said adhesive applying step includes providing the one side of the web with a plurality of longitudinally extending stripes of adhesive.

3. The method of claim 1, wherein said adhesive applying step includes providing the one side of the web with a plurality of transversely extending stripes of adhesive.

4. The method of claim 1, wherein said adhesive applying step includes coating the web with adhesive in a flexographic printer.

5. The method of claim 1, wherein said adhesive applying step includes coating said one side of the web with a repeatedly activatable low-viscosity disperse adhesive.

6. The method of claim 1, wherein the web has an antiadhesive coating.

7. The method of claim 1, further comprising the step of providing said one side of the web with a bonding primer prior to said adhesive applying step.

8. Apparatus for making self-sticking note pads with overlapping partially coherent sheets having a first size, comprising a source of supply of a paper web; means for advancing the web from said source along a predetermined path; means for applying adhesive to one side of the web in a first portion of said path; a cross cutter adjacent a second portion of said path and having means for subdividing the web into a succession of panels having a second size which is a multiple of said first size; means for gathering the panels into a series of stacks; means for applying bottom covers to the stacks; means for trimming the stacks; stack subdividing means for subdividing each trimmed stack into a plurality of pads; and means for transporting the pads to a further processing station.

9. The apparatus of claim 8, wherein said adhesive applying means comprises a flexographic printer.

10. The apparatus of claim 8, further comprising means for applying to the one side of the web a bonding primer coating intermediate said source and said adhesive applying means.

11. The apparatus of claim 8, further comprising an imprinting mechanism adjacent a third portion of said path and having means for applying printed matter to selected portions of the web.

12. The apparatus of claim 8, further comprising means for monitoring the condition of panels and means for segregating defective panels from satisfactory panels ahead of said stack subdividing means.

13. The apparatus of claim 8, further comprising means for changing the orientation of the stacks and of the respective bottom covers ahead of said stack subdividing means.

14. The apparatus of claim 8, further comprising means for conveying the stacks and the bottom covers from said trimming means toward said processing station, including means for changing the direction of travel of stacks ahead of said stack subdividing means.

15. The apparatus of claim 14, wherein said stack subdividing means comprises a support, a knife carrier removably mounted on said support, and a plurality of knives fixedly secured to said carrier.

* * * * *